Figure 1:
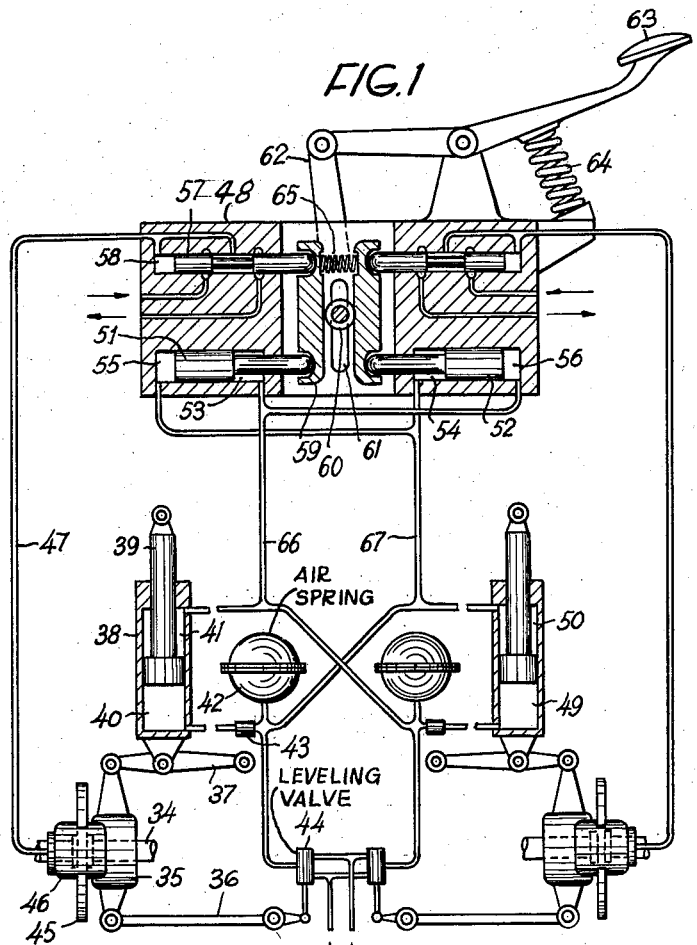

Aug. 20, 1963   F. A. WETTSTEIN   3,101,220
AUTOMATIC BRAKING PRESSURE PROPORTIONER FOR VEHICLES
Filed Dec. 4, 1961

INVENTOR.
Fritz Alexander Wettstein
BY
Pierce, Scheffler & Parker
attys

United States Patent Office

3,101,220
Patented Aug. 20, 1963

3,101,220
AUTOMATIC BRAKING PRESSURE PROPORTIONER FOR VEHICLES
Fritz Alexander Wettstein, Goteborg, Sweden, assignor to Aktiebolaget Volvo, Goteborg, Sweden
Filed Dec. 4, 1961, Ser. No. 156,794
Claims priority, application Sweden Dec. 7, 1960
4 Claims. (Cl. 303—22)

This invention relates to a device for automatic proportioning of the braking pressure among the various ground wheels of a vehicle provided with servo pressure springs and servo pressure brakes, and the object of the invention is to adapt the braking pressures automatically to the distribution of the load on the wheels of the vehicle.

Control mechanisms are known which comprise a balancing device between a member adapted to be actuated by the spring pressure on each wheel and a member adapted to be actuated by the braking pressure on the same wheel, wherein the balancing device is adapted to act upon a braking pressure control member, and wherein an actuating means is provided for adjusting the lever ratio of the balancing device.

In case of servo pressure springs acting on each wheel independently of the other ones additional mechanical stabilizers, such as anti-roll members or the like, have to be provided, resulting in that the spring pressure and, consequently, the braking pressure will not be proportional to the total load on the wheel because of the fact that part of the forces occurring between the wheel and the chassis are transmitted by these stabilizers.

If instead differential piston springs with cross-connected differential chambers are used, the system can take spring actions as well as rolling and pitching motions so that additional stabilizers can be avoided and, as a result, the spring pressure will be exactly proportional to the load on the wheel. In accordance with the invention, the previously named control device is made use of in a spring system of the last-named type, and the invention is characterized by the fact that the spring pressure actuated member consists of a differential piston having counteracting piston areas the diameter ratio of which equals the diameter ratio of the differential piston spring of the appertaining wheel, that the larger piston chambers of the spring actuated member and the differential piston spring communicate with each other, and that their smaller piston chambers also communicate with each other.

The invention results in the advantages of an automatic proportioning of the braking pressure among all of the wheels in proportion to the loads on the wheels. As a result, complete braking force compensation is obtained for static changes in load as well as dynamic changes of the loads on the wheels during braking operation when the load on the front wheels increases and the load on the rear wheels decreases, and when the vehicle takes a bend in which case the load is moved from the inner wheels to the outer wheels. Consequently, the invention renders possible maximum braking action without any of the wheels jamming prior to the other ones in case of an even road.

Figure 2:
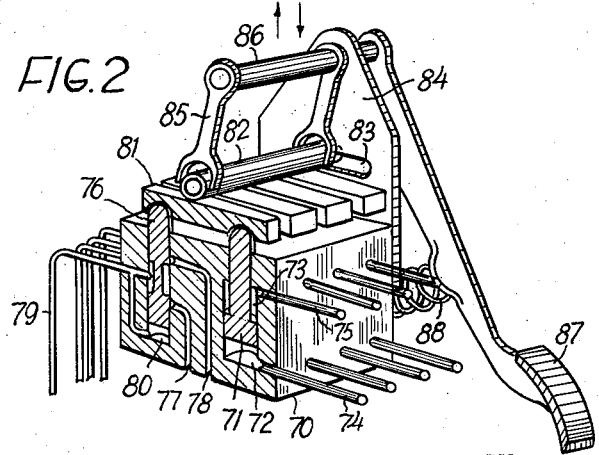

The invention is described more closely hereinbelow with reference to the annexed drawing in which FIG. 1 is a partly sectional diagrammatic view of a control system for a vehicle having a servo spring system with cross-connected differential piston springs, and FIG. 2 is a partly sectional perspective view of a brake control mechanism.

In FIG. 1, numeral 34 denotes the axle of a vehicle wheel. The axle 34 is mounted in an axle support 35 which by means of suspension arms 36 and 37 is connected to the frame, not shown, of the vehicle. The upper suspension arm 37 is articulated to telescopic element consisting of a cylinder 38 and a differential piston 39 movable therein and dividing the cylinder space into a larger chamber 40 and a smaller chamber 41. The upper end of the differential piston 39 is articulated to the frame of the vehicle. The telescopic element is filled with a liquid under pressure, and the chamber 40 communicates with a liquid space in a pressure container 42 which by means of a diaphragm is divided into a liquid space and a gas space. In the connecting conduit between the chamber 40 and the pressure container 42 there is provided a damping device 43, and the system also communicates with a levelling device 44. Mounted on the wheel axle 34 is a brake disk 45 adapted to be braked by means of brake pads operable by a brake cylinder 46 which by means of a pressure liquid conduit 47 is connected with a casing 48 for a brake control mechanism.

Parts similar to those described above are associated with the other wheels of the vehicle and need not be described in detail. The larger chamber of a telescopic element for another wheel is indicated at 49 and the corresponding smaller chamber at 50.

The brake control mechanism housed in the casing 48 comprises two spring pressure actuated members 51 and 52 in the form of differential pistons which are displaceable in cylinders in the casing and confine small differential chambers 53 and 54, respectively, and large differential chambers 55 and 56, respectively. Further, braking pressure control pistons 57 are movable in cylinders in the casing 48. Behind the piston heads said cylinders provide braking pressure chambers 58 which through the conduit 47 are connected with the respective brake cylinder 46. The ends of the pistons 51, 52 and 57 bear on balance arms 59 which in turn bear on a roller 60. The roller is guided in slots 61 in the casing 48 and displaceable along the slots by means of a lever 62 which is articulated to a brake pedal 63. A compression spring 64 tends to maintain the pedal 63 and the lever 62 in a position in which the roller 60 confronts the pistons 51 and 52. Inserted between the balance arms 59 is a compression spring 65 which confronts the braking control pistons 57. The chambers 41, 49, 53 and 56 are interconnected by means of a conduit system 66, and the chambers 40, 50, 54 and 55 are interconnected by means of a conduit system 67.

The mode of operation of the control mechanism is as follows. The levelling device 44 which communicates with the pressure side and the return side of a source of liquid under pressure, is in a conventional manner actuated by an elongated part of the lower suspension arm 36 such that in normal position the piston 39 of the servo pressure spring always assumes the same position so that in normal position the vehicle clearance height will always be constant irrespective of the load. The pressure prevailing in the cylinders 38 and containers 42 is a measure of the load on the vehicle and its wheels. This pressure is also transmitted to the spring pressure actuated members 51, 52 so that the force by which the pistons are urged against the balance arms 59 also will be proportional to the load on the wheel. Pressure and return conduits from a source of liquid under pressure communicate with the braking pressure control pistons 57. If these pistons are forced inwards from intermediate positions as a result of an increased pressure acting on one or both of the pistons 51, 52 and as a result of a swinging movement of the balance arm 59 about its fulcrum on the roller 60, the braking pressure conduit will be connected with the conduit 47, the brake cylinder 46 and the chamber 58 to the left of the piston 57. The increased pressure results in an increased braking effect. At the same time, the piston 57 tends to return to its intermediate position, this return movement taking place when the force which urges the piston 57 toward the balance arm 59 is in equilibrium with the force exerted by the piston 51, in which case the pressure in the brake cylinder 46 and in the chamber 58 automatically adapts itself to the pressure acting on the piston 51, which last-named pressure is proportional to the spring pressure. As a result, the braking pressure, too, will be proportional to the spring pressure. The ratio of the spring pressure to the braking pressure is defined by the fulcrum of the balance arm 59, that is, by the position of the roller 60. The more the roller 60 is moved toward the piston 57 by means of the brake pedal 63 and the lever 62, the higher is the braking pressure, whereas the brake is released when the roller 60 confronts the piston 51.

Since the piston elements 39 are differential pistons and since the resulting differential chambers of two spring elements are cross-connected to each other, a soft spring action will be obtained in case of parallel deflection of the two elements, whereas a stiffer spring action will be obtained in case of opposed deflections. If, as described, the pair of springs on each vehicle axle is cross-connected the vehicle will have a comparatively high resistance to roll while a soft spring action is obtained in other respects. On the other hand, if diametrically opposite wheels are crosswise interconnected, a high resistance to rolling as well as pitching motion will be obtained.

As mentioned above, the spring pressure actuated members 51, 52 are differential pistons, the arrangement being such that the larger differential chambers of the spring elements and the pressure members communicate with each other and that the smaller differential chambers thereof also communicate with each other. Due to the fact that the diameter ratio of the areas of the differential pistons is the same in the spring elements as in the pressure members, the forces exerted on the balance arms 59 by the pistons 51 and 52 will always be proportional to the forces of the appertaining spring elements. Seeing that the force acting on the respective spring element comprises the pure spring load as well as the roll load and pitch load, the braking pressure will be proportional to the total spring load.

The braking pressure should really be proportional to the load on the wheel rather than to the spring pressure. The load on the wheel is equal to the sum of the spring pressure and the total unsprung weight of the wheel. As a result of the insertion of the spring 65 as an additional load on the braking pressure control pistons 57 the braking pressure in the chamber 58 will be increased by a constant value such that an appropriate spring rate of the spring 65 will result in complete proportionality between the braking pressure and the wheel load.

FIG. 2 illustrates a modified embodiment of the brake control mechanism. In a casing 70 spring pressure members in the form of differential pistons 71 are movable in individual cylinders divided by the pistons into large differential chambers 72 and small differential chambers 73. Each chamber 72 communicates through a conduit 74 with a conduit system corresponding to the conduit system 66 shown in FIG. 1, whereas the smaller differential chambers 73 by means of conduits 75 are similarly connected with a conduit system corresponding to the conduit system 67. Braking pressure control pistons 76 provided in individual cylinders in the casing 70 are constructed in the form of slide valves adapted to open and shut-off pressure and return conduits 77 and 78, respectively, which communicate with a source of liquid under pressure. Each of these cylinders communicates with a brake cylinder at the appertaining wheel through a conduit 79 and with a chamber 80 below the piston 76. The braking control piston 76 and the spring pressure piston 71 are projecting out of the casing 70 and bear on a balance arm 81 the upper side of which engages a roller 82 which serves as a displaceable fulcrum of the balance arm 81. The roller 82 extends at right angles to the balance arm and is guided in slots 83 in plates 84 provided on either side of the casing 70. The roller 82 is displaceable longitudinally of the balance arm 81 by means of forks 85 secured to a shaft 86 adapted to be turned by a brake pedal 87 which by means of a compression spring 88 is biassed to a predetermined neutral position.

Mounted in the casing 70 are four separate sets of the above described brake control devices, each set being provided for an appertaining wheel. However, the roller 82 acting on the balance arms 81 and the roller actuating means are common to the system.

What I claim is:

1. A brake and suspension system of a wheeled vehicle responsive to the load on the ground wheels comprising, in combination, a hydro-pneumatic differential piston spring on each wheel, said piston having two counteracting piston areas of different sizes and defining a larger differential piston chamber and a smaller differential piston chamber, respectively; the larger piston chamber of a spring on one side of the vehicle communicating with the smaller piston chamber of a second, similar spring on the other side of the vehicle and the smaller piston chamber of said spring on said one side of the vehicle communicating with the larger piston chamber of said second spring on said other side of the vehicle; and a braking device including braking means on each wheel operated by a fluid under pressure; means to control the braking action of the system and comprising for each wheel a member adapted to be actuated by the pressure of the differential piston spring and a member to be actuated by the braking pressure of said fluid; a balancing device comprising a lever the ends of which being in contact with said spring pressure actuated member and said braking pressure actuated member, respectively; an actuating means for adjusting the lever ratio of said balancing lever; and a braking pressure control member adapted to be acted upon by said balancing device; said spring pressure actuated member consisting of a differential piston having counteracting piston areas the diameter ratio of which equals the diameter ratio of the differential piston spring of the appertaining wheel; the larger piston chambers of the spring pressure-actuated member and of the differential piston spring communicating with each other; whereas their smaller piston chambers also communicate with each other.

2. A system as claimed in claim 1, in which said braking pressure actuated member consists of a piston forming a unit together with said braking pressure control member which consists of a slide valve.

3. A system as claimed in claim 1, in which the means for controlling the braking action for a plurality of vehicle wheels are arranged in a common casing, said actuating means comprising a roller serving as a common fulcrum for all of said balancing levers.

4. A system as claimed in claim 1, in which said braking pressure actuated member is spring-loaded.

References Cited in the file of this patent

UNITED STATES PATENTS

| | | |
|---|---|---|
| 2,498,438 | Rostu | Feb. 21, 1950 |
| 2,538,274 | Sanmori | Jan. 16, 1951 |